United States Patent
Park et al.

(10) Patent No.: US 7,754,168 B2
(45) Date of Patent: *Jul. 13, 2010

(54) CONCENTRATE OF FINE CERIA PARTICLES FOR CHEMICAL MECHANICAL POLISHING AND PREPARING METHOD THEREOF

(75) Inventors: Se-Woong Park, Daejeon (KR); Wan-Jae Myeong, Daejeon (KR); Jin-Soo Baik, Daejeon (KR); Chang-Mo Chung, Daejeon (KR); Kyu-Ho Song, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 785 days.

This patent is subject to a terminal disclaimer.

(21) Appl. No.: 10/557,940

(22) PCT Filed: May 21, 2004

(86) PCT No.: PCT/KR2004/001222

§ 371 (c)(1),
(2), (4) Date: Nov. 18, 2005

(87) PCT Pub. No.: WO2004/104226

PCT Pub. Date: Feb. 12, 2004

(65) Prior Publication Data

US 2007/0212289 A1 Sep. 13, 2007

(30) Foreign Application Priority Data

May 22, 2003 (KR) .................. 10-2003-0032574

(51) Int. Cl.
*C01F 17/00* (2006.01)
*B24D 3/00* (2006.01)

(52) U.S. Cl. .............. 423/21.1; 423/263; 501/152; 51/309

(58) Field of Classification Search ........... 423/21.1, 423/263; 501/152; 51/309
See application file for complete search history.

(56) References Cited

U.S. PATENT DOCUMENTS

| 5,433,878 A | 7/1995 | Arai et al. ............ 252/62.63 |
| 5,480,630 A | 1/1996 | Arai et al. ............ 423/625 |
| 5,543,126 A * | 8/1996 | Ota et al. ............ 423/263 |
| 5,635,154 A | 6/1997 | Arai et al. ............ 423/592 |
| 5,938,837 A * | 8/1999 | Hanawa et al. ............ 117/68 |
| 5,962,343 A * | 10/1999 | Kasai et al. ............ 438/693 |

FOREIGN PATENT DOCUMENTS

| JP | 10106993 | 4/1998 |
| JP | 10154672 | 6/1998 |
| JP | 2000160136 | 6/2000 |
| KR | 0006824 | 1/2004 |
| WO | WO8704421 | 7/1987 |
| WO | WO9729510 | 8/1997 |
| WO | WO9311959 | 6/1999 |

OTHER PUBLICATIONS

Tetsuya Hoshino, Yasushi Kurata, Yuuki Terasaki, Kenzo Susa, "Mechanism of polishing of SiO2 films by CeO2 particles" Journal of Non-Crystalline Solids 283 (2001) pp. 129-136.*
Y. Hakuta, S. Onai, H. Terayama, T. Adschiri, K. Arai, "Production of ultra-fine ceria particles by hydrothermal synthesis under supercritical conditions" Journal of Materials Science Letters 17 (1998) pp. 1211-1213.*

* cited by examiner

*Primary Examiner*—Timothy C Vanoy
*Assistant Examiner*—Diana J Liao
(74) *Attorney, Agent, or Firm*—Abelman, Frayne & Schwab

(57) ABSTRACT

Disclosed are a concentrate of fine ceria particles for chemical mechanical polishing, and a method of preparing the same. The method includes reacting a reactant mixture comprising i) water, ii) an aqueous solution of water-soluble cerium salt compound, and iii) ammonia or ammonium salt at a reaction temperature of 250-700? under a reaction pressure of 180-550 bar for 0.01 sec to 10 min in a continuous reactor to obtain a solution containing the fine ceria particles, the cerium salt compound being contained at an amount of 0.01 to 20 wt % in the reactant mixture; and concentrating the solution containing the fine ceria particles in a concentrator having a filter with a pore size of 0.01 to 10?. The concentrate is advantageous in that a CMP slurry and a dispersing solution are easily produced by diluting the concentrate and adding an additive to the concentrate.

9 Claims, No Drawings

CONCENTRATE OF FINE CERIA PARTICLES FOR CHEMICAL MECHANICAL POLISHING AND PREPARING METHOD THEREOF

TECHNICAL FIELD

The present invention pertains, in general, to a concentrate of fine ceria particles for chemical mechanical polishing (CMP), and a method of preparing the same. More particularly, the present invention relates to a concentrate of fine ceria particles for CMP, and a method of preparing the same, in which an aqueous solution of water-soluble cerium salt compound and ammonia or ammonium salt are continuously reacted with each other under supercritical or near supercritical water conditions, and a reaction product is concentrated.

In this regard, the concentrate is very useful as a CMP slurry for semiconductor planarization, and an abrasive material for an optical glass. Furthermore, the concentrate may be applied to an electrode of a solid oxide fuel cell, a coating field, and a ceria-based catalyst field.

BACKGROUND ART

Generally, a method of preparing a concentrate of fine ceria particles with relatively high purity, includes providing fine and dry ceria particles with the relatively high purity, and thickly dispersing the particles in a medium, such as water, or synthesizing the fine ceria particles in the medium, such as water, in a relatively high concentration.

Meanwhile, a process of preparing the fine ceria particles is classified into gas, liquid, and solid phase processes according to a phase in which the particles are produced.

In the case of the gas phase process, a cerium metal or a cerium metal precursor is gasified, and then reacts with oxygen and the like. The gas phase process may be classified into various processes, such as a flame combustion pyrolysis process, a laser gasification process, a plasma gasification process, and a spray pyrolysis process, according to a gasification manner or a reaction manner. However, the gas phase process is disadvantageous in that a great amount of energy is consumed, the costs of equipments are relatively high, and the productivity is relatively low, even though it has some advantages in that a relatively simple process is ensured and fine particles with a uniform particle size are produced. Hence, the fine ceria particles produced according to the gas phase process are costly.

A calcination process, regarded as a representative process of the solid phase process, is a traditional process of preparing metal oxide particles, in which cerium carbonate used as a precursor is pyrolyzed for a relatively long time in a high temperature furnace, oxidized to produce ceria, and crystallized for a relatively long time to produce powder. In this regard, the powder is crushed into fine particles.

WO 99/31195 and Japanese Pat. Laid-Open Publication Nos. Hei. 10-106993, 10-154672, and 12-160136 disclose a technology of preparing ceria particles for semi-conductor planarization, in which cerium carbonate as a raw material is heated at high temperatures for a long time in a calcination furnace, subjected to a dry crushing process to produce particles with a particle size of μm unit. At this time, the particles are subjected to a solution high-speed jet milling process to become fine, and the fine particles are filtered to accomplish a CMP slurry. However, the technology is disadvantageous in that the raw material is heated at high temperatures for a long time, impurities are easily mixed with the particles during the crushing and high-speed milling processes, a great amount of energy is consumed, and a production time of the ceria particles is very long. Other disadvantages are that coarse particles with the particle size of 1 μm or more exist in the final ceria particles because it is difficult to desirably control the particle size to convert all primary particles into the fine particles. Accordingly, in the above technology, it is necessary to filter the end CMP slurry, bringing about the loss of the particles.

As for a mechano-chemical process (MCP), a surface of a precursor, such as cerium chloride, is activated (high temperature and the like) by a high-speed and high-energy mechanical stimulation (high-speed ball milling), thereby completing a desired reaction. However, the MCP has disadvantages in that impurities are added into desired particles due to balls and vials during the ball milling process, it is very difficult to wash a large amount of alkali metal salt added as an additive to the particles, a reaction time is very long, and production costs of the particles are very high because it is necessary to conduct a calcination process.

Meanwhile, with respect to a method of preparing fine ceria particles for semi-conductor planarization use according to the liquid phase process, WO 97/29510 suggests three methods of preparing the ceria particles: a first method of preparing ceria, including milling a nonaqueous cerium salt compound (cerium carbonate) with a valence of 3, dispersed in water, oxidizing the milled cerium salt compound using an oxidizing agent (hydrogen peroxide), and hydrothermally treating the resulting compound, a second method of preparing ceria, including oxidizing the aqueous cerium salt compound (cerium nitrate) with the valence of 3 using the oxidizing agent, and hydrothermally treating the resulting compound, and a third method of preparing ceria, including controlling the pH of the aqueous cerium salt compound (ammonium cerium nitrate) with the valence of 4 so as to enable the cerium salt compound to be alkaline to produce cerium hydroxide, and hydrothermally treating the cerium hydroxide.

However, the above three methods are disadvantageous in that a produced amount of ceria is limited because ceria is produced according to a batch process. Additionally, when the resulting ceria particles contain waste acidic and alkaline materials, purification, washing, and drying processes of the ceria particles are inevitably required, and thus, the methods are complicated and it is difficult to massproduce the ceria particles. Further, the methods have the disadvantages of a large particle size and a wide particle size distribution.

Meanwhile, a supercritical hydrothermal synthesis, which is a kind of a hydrothermal process, has been studied by Ajri et al. in Japanese, as recited in Ind. Eng. Chem. Res. Vol. 39, 4901-4907 (2000), in which a water-soluble cerium salt is treated under a condition of supercritical water ($T_c \geqq 374°$ C., $P_c \geqq 22.4$ MPa) to easily produce fine nano-sized particles.

WO 87/04421 and U.S. Pat. No. 5,635,154 disclose a process of preparing fine metal oxide particles according to batch and continuous type of supercritical hydrothermal syntheses. However, the batch type of supercritical hydrothermal synthesis has disadvantages in that a reaction is conducted for a relatively long time (tens or more min), and thus, it is difficult to desirably control a particle size and a particle size distribution is wide. As for the continuous type of supercritical hydrothermal synthesis, it has advantages in that the reaction is completed within a relatively short time of 1 to 60 sec, it is not necessary to conduct a calcination process, purity of a product is high, and it is easy to control the crystallization, a particle size, and a shape of the fine particles. However, the batch and continuous type of supercritical hydrothermal syntheses are problematic in that it is necessary to separate the particles from a solution phase and to wash the particles because waste acid, such as nitric acid, is generated during the reaction.

U.S. Pat. Nos. 5,433,878, 5,480,630, and 5,635,154 disclose a technology of preparing fine metal oxide particles, in which a water-soluble metal salt compound is reacted in a continuous tubular reactor at 200° C. or higher under pressure of 250 to 500 kg/cm$^2$ for 1 to 10 min. However, these U.S. patents all have the disadvantage of the generation of waste acid as a by-product.

An effort has been made to avoid the above disadvantages. For example, reference may be made to the patent which has been made by the applicant of the present invention, Korean Pat. Application No. 2002-0041376 (a method of preparing fine metal oxide particles), which discloses a continuous supercritical, hydrothermal synthesis. In this regard, a metal salt aqueous solution and an aqueous solution of ammonia are reacted with each other in a reactor to produce fine metal oxide particles, with nitric acid as a by-product. At this time, nitric acid is decomposed while the fine metal oxide particles are produced, thereby significantly reducing a content of nitrogen-containing compounds in waste water generated during a reaction of the metal salt aqueous solution and an aqueous solution of ammonia. With respect to this, a concentration process, such as centrifuge or filtering processes, an oven drying process, a lyophilizing process, or a spray drying process may be conducted to recover the particles from the metal oxide solution. However, the above drying processes are problematic in that considerable time and costs are consumed to recover the dry particles. Particularly, the above Korean patent is disadvantageous in that it is difficult to massproduce the fine metal oxide particles according to the centrifuge and lyophilizing processes, physical properties of the particles may be changed to agglomerate or aggregate the fine metal oxide particles during the oven drying process, and it is necessary to crush a dried cake to produce metal oxide powder.

DISCLOSURE OF INVENTION

Technical Problem

The present inventors have conducted extensive studies to avoid the above disadvantages occurring in the prior arts, resulting in the finding that when fine ceria particles are prepared according to a supercritical hydrothermal synthesis, a fluid containing ammonia (for example, an aqueous solution of ammonia) is added into a reactor in conjunction with raw materials to decompose nitric acid as a by-product in the reactor while a highly pure concentrate of ceria particles for CMP slurry is produced, a concentrator having a metal filter is installed at a rear end of the reactor to produce various concentrations of concentrates of the fine ceria particles, having few nitrates and impurities, and a CMP slurry for semiconductor planarization is easily produced by diluting the concentrate and mixing the concentrate with an additive, thereby accomplishing the present invention.

Technical Solution

Accordingly, an object of the present invention is to provide a method of preparing a concentrate of fine ceria particles for CMP, in which nitric acid is decomposed while the fine, nano-sized ceria particles are synthesized. In this regard, a ceria slurry, which has few impurities and is continuously produced, is concentrated to a desired concentration. Therefore, a desired CMP slurry for semiconductor planarization is produced at relatively low costs by diluting the concentrate and adding an additive to the concentrate without an additional process, such as washing and drying processes.

Another object of the present invention is to provide a concentrate of fine ceria particles for CMP, produced according to the above method.

In order to accomplish the above objects, the present invention provides a method of preparing a concentrate of fine ceria particles for chemical mechanical polishing. The method includes reacting a reactant mixture comprising i) water, ii) an aqueous solution of water-soluble cerium salt compound, and iii) ammonia or ammonium salt at a reaction temperature of 250-700° C. under a reaction pressure of 180-550 bar for 0.01 sec to 10 min in a continuous reactor to obtain a solution containing the fine ceria particles, the cerium salt compound being contained at an amount of 0.01 to 20 wt % in the reactant mixture; and concentrating the solution containing the fine ceria particles in a concentrator having a filter with a pore size of 0.01 to 10 μm.

Furthermore, the present invention provides a concentrate of fine ceria particles for chemical mechanical polishing, produced according to the above method. The concentrate includes 10 ppm or less of cationic impurities, and 10 ppm or less of anionic impurities.

Advantageous Effects

In the present invention, an average size of primary particles is easily controlled, nitric acid as a by-product is desirably decomposed, and it is easy to produce a reaction product solution similar to in the case of dispersing highly pure powder, containing few impurities, in water. Accordingly, a separating process of waste water containing the by-product and a washing and purifying process of the powder, which are regarded as essential processes in a conventional liquid phase process of preparing metal oxides, may be omitted. Additionally, the reaction product solution is sufficiently concentrated in a concentrator installed at a rear end of a reactor to produce highly pure ceria particles, containing few impurities, and the ceria particles is usefully applied to produce a polishing slurry. Therefore, the present invention is advantageous in that energy and time required in a solid/liquid phase separation process and a drying process are significantly reduced, a loss of the powder, easily occurring in the solid/liquid phase separation process and drying process, is avoided, and aggregation and thermal deformation of the particles, constituting the powder, due to the drying process are avoided, thereby ensuring excellent economic efficiency and preparing the fine ceria particle with excellent quality.

Moreover, the concentrate of fine ceria particles, which is produced through a diluting process and an additive adding process according to the present invention, may be used as a polishing solution. When the polishing is conducted using the concentrate as the polishing solution, a polishing speed is very high and a polishing speed ratio (selectivity) of a silicon oxide layer to a silicon nitride layer is very high in comparison with the case of using a conventional colloidal silica. Furthermore, the production of the polishing solution according to the present invention is easily conducted. As well, the polishing solution of the present invention is the same as or superior to the conventional polishing solution using dry particles in terms of polishing characteristics, such as dispersion characteristics, the polishing speed of the silicon oxide layer, and the selectivity of the silicon oxide layer to the silicon nitride layer.

Best Mode

Hereinafter, a detailed description will be given of the present invention.

The present invention provides a concentrate of fine ceria particles and a method of preparing the same, in which deionized water, an aqueous solution of water-soluble cerium salt compound, ammonia or ammonium salt are continuously reacted in a continuous reactor at a reaction temperature of 250 to 700° C. under a reaction pressure of 180 to 550 bar, to produce a solution containing the fine particles with a particle size of 1 to 200 nm and simultaneously decompose nitric acid as a by-product in the same reactor. Thereby, an amount of nitric acid in waste water generated during the synthesis of the fine ceria particles is significantly reduced, and the highly pure concentrate, containing the fine ceria particle, is produced by concentrating a product solution, which contains few impurities, such as the nitrogen-containing compounds, in a concentrator.

In the present invention, examples of the cerium salt compound include cerium nitrate, ammonium cerium nitrate, and a mixture thereof.

According to the present invention, cerium salt compound is not limited in concentration thereof. For example, cerium salt compound in the total reactant has a concentration of 0.01 to 20 wt %, and preferably, 0.05 to 10 wt %. When the concentration of the cerium salt compound is less than 0.01 wt %, the solution is very dilute, and thus, economic efficiency is not secured. On the other hand, when the concentration is more than 20 wt %, the solution is very thick, and thus, the solution has high viscosity, thereby disturbing the smooth flowing of the solution and adversely affecting the quality of the concentrate.

According to the present invention, the ammonia or ammonium salt serves to convert the toxic nitrogen-containing compounds, which are generated concurrently with the synthesis of the fine ceria particles, into the harmless ones. As such, the preferable form thereof is an ammonia gas, an aqueous ammonia solution, or an aqueous solution of ammonium salt, such as ammonium carbamate. The ammonia or ammonium salt is used in a molar ratio of 0.5-3, and preferably 0.8-2, relative to the nitric acid to be converted stoichiometrically from the used cerium salt compound by the fine ceria particle synthesis reaction . When such a molar ratio is less than 0.5, the conversion of the harmful nitrogen-containing compound becomes insufficient. Meanwhile, the molar ratio exceeding 3 results in too large amounts of ammonia or ammonium salt contained in the effluent solution.

According to the present invention, the reaction is performed under supercritical (or near supercritical) water conditions of 250° C. or higher and 180 bar or more, preferably 250-700° C. and 180-550 bar, and more preferably, 300-550° C. and 200-400 bar. If the reaction is performed at the temperature lower than 250° C. under the pressure less than 180 bar, the synthesized particles have a large particle size, and as well, the nitrogen-containing compound by-product is insufficiently decomposed. Meanwhile, too-high temperature and pressure lead to re-dissolution of the fine ceria particles, thus negating economic benefits. As a time required for the complete mixing of the used reactants is shorter, the resulting particle size becomes further uniform. Therefore, a mixer is designed to have a desired particle size distribution. Further, the reaction temperature and reaction pressure as well as the feeding rate, feeding position and concentration of the reactant fluids should be properly controlled.

As for the reactor useful in the present invention, since both the synthesis of the fine ceria particles and the conversion of the toxic nitrogen-containing compound are performed within a short time, a continuous reactor capable of shortening the reaction time is preferably used, rather than a batch-type or semi-batch-type requiring a long reaction time. Examples of a shape of the continuous reactor include a tube, a cylinder, a square, and a rectangle. In particular, a tube-type reactor is most preferable. Furthermore, an interior structure may be installed in the continuous reactor to desirably mix the reactants in the continuous reactor. As for the reaction time, it may be changed according to circumstances. The reaction time may be 0.01 sec to 10 min, and preferably 0.1 sec to 2 min.

The water may be previously heated at a predetermined temperature and pressurized under a predetermined pressure so as to facilitate the provision of the pressure and temperature required for causing the synthetic reaction of the fine ceria particles upon mixing with the aqueous solution of cerium salt compound and the fluid containing ammonia or ammonium salt.

The mixing of the reactants may be carried out in the multi-step as well as in the single step. For example, the heated and pressurized water may be firstly mixed with the fluid containing ammonia or ammonium salt, and then mixed with an aqueous solution of cerium salt compound. Alternatively, the water may be firstly mixed with an aqueous solution of cerium salt compound, and then mixed with the fluid containing ammonia or ammonium salt. Alternatively, an aqueous solution of cerium salt compound may be firstly mixed with the fluid containing ammonia or ammonium salt, and then mixed with the water.

Meanwhile, in order to control the sizes, shapes, physical properties of the synthesized particles, and the synthesizing speed, an alkali solution, such as potassium hydroxide, or an acidic solution, such as sulfuric acid, may be added to the reactant mixture before or during the fine ceria particles synthesis. Preferably, the alkali or acid in the added solution amounts to a molar ratio of 0.1-20 relative to the cerium salt compound. Additionally, a reducing agent, such as hydrogen, or an oxidizing agent, such as oxygen and hydrogen peroxide, may be added in a molar ratio of 0.1 to 20 based on the cerium salt compound to the reactants before the reaction or during the reaction.

A volume of the concentrator for concentrating a solution, containing the fine ceria particles, is not limited, and non-limiting, examples of the filter installed in the concentrator include a metal sintered filter. Furthermore, it is preferable that a pore size of the filter is 0.01 to 10 μm. More preferably, the pore size of the filter is 0.1 to 5 μm. When the pore size of the filter is less than 0.01 μm, the filter is clogged with the particles, brining about a quick increase of a pressure difference before and after the filter. Accordingly, the concentrator is undesirably operated and it is difficult to desirably concentrate the solution, containing the ceria particles. On the other hand, when the pore size of the filter is more than 10 μm, most of the fine ceria particles pass through the filter without being filtered, thus disturbing a desirable concentration of the solution, containing the ceria particles. In addition, a washing process using the deionized water or other fluids may be conducted in the concentrator when occasion demands.

The concentrated solution contains 1 to 50 wt %, preferably 1 to 30 wt % of fine ceria particles, and recovered after the concentration of the solution is completed.

Produced through a continuous supercritical hydrothermal synthesis using the water-soluble cerium salt compound, such as cerium nitrate, ammonium cerium nitrate, and a mixture thereof, according to the present invention, the particles mostly consists of ceria. At this time, a full width at half maximum of a main peak in an X-ray diffraction analysis is substituted into the Scherrer equation to calculate an average particle size of 1 to 200 nm, and a specific surface area of the particles, measured according to a BET (Brunauer-Emmett-Teller) method, is 2 to 200 m$^2$/g.

As for impurities in the concentrate of solid/liquid mixed phase, it is preferable that contents of anion components, such as nitrate, nitrite, sulfate, and chlorine ions, and cation components, such as ammonium and sodium ions, each are 10 ppm or less. Hence, the concentrate has relatively high purity.

The concentrate of fine ceria particles according to the present invention may be used as a polishing solution through a diluting process and an additive adding process. At this time, examples of the additive include a dispersing agent. When the polishing is conducted using the concentrate as the polishing solution, a polishing speed is very fast and a polishing speed ratio (selectivity) of a silicon oxide layer to a silicon nitride layer is very high in comparison with the case of using a conventional colloidal silica. Furthermore, the production of the polishing solution according to the present invention is easily conducted. As well, the polishing solution using the concentrate of the present invention is the same as or superior to the conventional polishing solution using dry particles in terms of polishing characteristics, such as dispersion characteristics, the polishing speed of the silicon oxide layer, and the selectivity of the silicon oxide layer to the silicon nitride layer.

Mode for Invention

Having generally described this invention, a further understanding can be obtained by reference to examples and comparative examples which are provided herein for the purposes of illustration only and are not intended to be limiting unless otherwise specified.

EXAMPLE 1

Preparation of a Concentrate of Fine Ceria Particles

Deionized water was pumped at a flow rate of 76 g/min using a ¼ inch-exterior diameter tube, and then heated to 510° C., and pressurized to 230 bar. 2.8 wt % of aqueous cerium nitrate solution was pumped at a flow rate of 10 g/min through a ¼ inch-exterior diameter tube, and pressurized to 230 bar. An aqueous solution of ammonia having a molar ratio of 1.1 relative to the nitric acid to be converted stoichiometrically from the cerium nitrate by the subsequent cerium nitrate decomposing reaction was pumped at a flow rate of 10 g/min through a ¼ inch-exterior diameter tube, and pressurized to 230 bar. The aqueous cerium nitrate solution, the aqueous solution of ammonia, and heated deionized water, each of which was in the state of being pressurized, were mixed, and then reacted at 425° C. Two concentrators, each having a sintered filter with a pore size of 0.5 μm therein, were installed at a rear end of a heat exchanger, and alternately used to cool a high temperature reaction solution. Each concentrator was operated for 18 hours to produce 2 kg of concentrate, and a concentration of the concentrate was 9.8 wt %.

A portion of the concentrate was sampled, centrifuged, and dried to produce solids. The solids thusly produced were finely ground using a mortar to produce a powder, and the powder was used as a sample for analysis. A full width at half maximum of a main peak in an X-ray diffraction analysis was substituted into the Scherrer equation to calculate an average particle size of about 13 nm. Thereby, it was confirmed that the powder mostly consists of ceria. Additionally, a specific surface area of the powder was 64 m$^2$/g which was measured according to a BET method.

Impurities existing in the concentrate were analyzed using an ICP-MS. In this regard, contents of the alkali metal and alkali earth metal, each were 1 ppm or less, and a total content of the transition metals was 1 ppm or less. An analysis of the particle-free concentrate using an ion chromatography (IC) resulted in that concentrations of $NO_3^-$, $NO_2^-$, and $NH_4^+$ were 1.8 ppm, 0.2 ppm, and 5.0 ppm, respectively, and other ion components were not detected.

EXAMPLE 2

Preparation of a Concentrate of Fine Ceria Particles

Deionized water was pumped at a flow rate of 76 g/min using a ¼ inch-exterior diameter tube, and then heated to 480° C., and pressurized to 250 bar. 18.6 wt % of aqueous cerium nitrate solution was pumped at a flow rate of 10 g/min through a ¼ inch-exterior diameter tube, and pressurized to 250 bar. An aqueous solution of ammonia having a molar ratio of 1.1 relative to the nitric acid to be converted stoichiometrically from the cerium nitrate by the subsequent cerium nitrate decomposing reaction was pumped at a flow rate of 10 g/min through a ¼ inch-exterior diameter tube, and pressurized to 250 bar. The aqueous cerium nitrate solution, the aqueous solution of ammonia, and heated deionized water, each of which was in the state of being pressurized, were mixed, and then reacted at 400° C. Two concentrators, each having a sintered filter with a pore size of 0.5 μm therein, were installed at a rear end of a heat exchanger, and alternately used to cool a high temperature reaction solution. Each concentrator was operated for 1.5 hours to produce 2 kg of concentrate, and a concentration of the concentrate was 10.3 wt %.

A portion of the concentrate was sampled, centrifuged, and dried to produce solids. The solids thusly produced were finely ground using a mortar to produce a powder, and the powder was used as a sample for analysis. A full width at half maximum of a main peak in an X-ray diffraction analysis was substituted into the Scherrer equation to calculate an average particle size of about 52 nm. Thereby, it was confirmed that the powder mostly consists of ceria. Additionally, a specific surface area of the powder was 25 m$^2$/g which was measured according to a BET method.

Impurities existing in the concentrate were analyzed using an ICP-MS. In this regard, contents of the alkali metal and alkali earth metal each were 1 ppm or less, and a total content of the transition metals was 1 ppm or less. An analysis of the particle-free concentrate using an ion chromatography (IC) resulted in that concentrations of $NO_3^-$, $NO_2^-$, and $NH_4^+$ were 0.5 ppm, 0.1 ppm, and 3.5 ppm, respectively, and other ion components were not detected.

EXAMPLE 3

Preparation of a Concentrate of Fine Ceria Particles

Deionized water was pumped at 76 g/min using a ¼ inch-exterior diameter tube, and then heated to 450° C., and pressurized to 300 bar. 2.8 wt % of aqueous cerium nitrate solution was pumped at a flow rate of 10 g/min through a ¼ inch-exterior diameter tube, and pressurized to 300 bar. An aqueous solution of ammonia having a molar ratio of 1.1 relative to the nitric acid to be converted stoichiometrically from the cerium nitrate by the subsequent cerium nitrate decomposing reaction was pumped at a flow rate of 10 g/min through a ¼ inch-exterior diameter tube, and pressurized to 300 bar. The aqueous cerium nitrate solution, the aqueous solution of ammonia, and heated deionized water, each of which was in the state of being pressurized, were mixed, and then reacted at 385° C. Two concentrators, each having a sintered filter with a pore size of 0.5 μm therein, were installed at a rear end of a heat exchanger, and alternately used to cool a high temperature reaction solution. Each concentrator was operated for 18 hours to produce 2 kg of concentrate, and a concentration of the concentrate was 9.7 wt %.

A portion of the concentrate was sampled, centrifuged, and dried to produce solids. The solids thusly produced were finely ground using a mortar to produce a powder, and the powder was used as a sample for analysis. A full width at half maximum of a main peak in an X-ray diffraction analysis was substituted into the Scherrer equation to calculate an average particle size of about 73 nm. Thereby, it was confirmed that the powder mostly consists of ceria. Additionally, a specific surface area of the powder was 15 m$^2$/g which was measured according to a BET method.

Impurities existing in the concentrate were analyzed using an ICP-MS. In this regard, contents of the alkali metal and alkali earth metal each were 1 ppm or less, and a total content of the transition metals was 1 ppm or less. An analysis of the particle-free concentrate using an ion chromatography (IC) resulted in that concentrations of $NO_3^-$, $NO_2^-$, and $NH_4^+$ were 0.4 ppm, 0.1 ppm, and 3.1 ppm, respectively, and other ion components were not detected.

EXAMPLE 4

Preparation of a Ceria Polishing Solution, and the Polishing Tests

Three kinds of concentrates produced according to examples 1, 2, and 3 were sampled in amounts of 408.16 g, 388.35 g, and 412.37 g. Subsequently, deionized water was added to three kinds of concentrates in amounts of 1521.34 g, 1491.65 g, and 1467.63 g, and 60 g of polyacrylic acid ammonium salt solution (1.0 wt % of solids, and a molecular weight of 10,000) and 60 g of polyasparaginic acid ammonium salt solution (1 wt % of solids, and a molecular weight of 5,000) were added to each concentrate. The concentrate, deionized water, polyacrylic acid ammonium salt solution, and polyasparaginic acid ammonium salt solution were strongly shaken in an airtight container to be mixed with each other. pHs of three kinds of mixed solution were controlled to 7.0. First, second, and third polishing slurries were prepared. At this time, an amount of each polishing slurry was 2 kg.

The first, second, and third polishing slurries each had 2 wt % of solids, pH of 7.0, and excellent dispersibility. Further, a particle size of each polishing slurry was analyzed, resulted in that average sizes of secondary particles of the first, second, and third polishing slurries were 205 nm, 223 nm, and 270 nm, respectively, and zeta potentials of the first, second, and third polishing slurries were 52.3 mV, 36.8 mV, and 28.2 mV, respectively.

A silicon oxide sample, which was 20 mm wide by 20 mm long, and in which silicon oxide was coated in a thickness of 10000 Å on a silicon substrate, and a silicon nitride sample, which was 20 mm wide by 20 mm long, and in which silicon nitride was coated in a thickness of 3000 Å on the silicon substrate, were subjected to a polishing test using a mini polisher. First, second, and third polishing slurries were dropped in an amount of 110 ml/min onto the silicon oxide and silicon nitride samples, and the silicon oxide and silicon nitride samples were polished for 2 min. At this time, the silicon oxide and silicon nitride samples each were polished twice for each polishing slurry, and the polished silicon oxide and silicon nitride samples were washed with a nitric acid solution and ultra-pure water, and then dried. Thicknesses of the silicon oxide and silicon nitride samples were measured using a photo-interference thickness measuring device before and after the samples were polished, and the results, including a polishing speed and a polishing selectivity, are described in the following Table 1.

In this respect, the selectivity is defined as a ratio of the polishing speed of the silicon oxide layer to the polishing speed of the silicon nitride layer.

COMPARATIVE EXAMPLE 1

Preparation of the Solution of Ceria Particles

The present example was performed in the same manner as in Example 2, except that the aqueous solution of ammonia was not used. 27.5 kg of the solution of ceria particles was produced and a concentration of the solution of ceria particles was 0.76 wt %. An analysis of the particle-free concentrate using an ion chromatography (IC) resulted in that concentration of $NO_3^-$ was 852 ppm.

Preparation of Dry Ceria Powder

A procedure, in which the solution is centrifuged and re-dispersed in distilled water, was repeated 10 times to washing nitric acid in the solution, and an analysis of the particle-free solution using the IC resulted in that concentrations of $NO_3^-$ and $NO_2^-$ were 25.4 ppm and 12.1 ppm, respectively. The cake obtained from the centrifugation was dried in an oven at 90° C. for 24 hours, and the dried cake was finely ground using a mortar to produce 189 g of light yellow powder. In a theoretical calculation regarding concentrations of reactants and a reaction time, an amount of the produced powder was 206 g. Therefore, it can be seen that the powder was lost by about 17 g (8.25%) during centrifuging and drying processes. The light yellow powder was confirmed as ceria by a powder X-ray diffraction analysis, and a full width at half maximum of a main peak in the X-ray diffraction analysis was substituted into the Scherrer equation to calculate an average particle size of 53 nm. Additionally, a specific surface area of the powder was 25 m$^2$/g, which was measured according to a BET method. Impurities existing in the powder were analyzed using an ICP-MS, resulted in that a total content of alkali metals and alkali earth metals was 48.2 ppm, and a total content of transition metals was 63.2 ppm. The deionized water was added to the dry ceria powder so that a concentrate having a concentration of 10.3 wt % was prepared. An analysis of the particle-free concentrate using an ion chromatography (IC) resulted in that concentration of $NO_3^-$ was 18.9 ppm.

COMPARATIVE EXAMPLE 2

Preparation of a Ceria Polishing Solution using Dry Powder, and the Polishing Tests 1840 g of deionized water, 60 g of polyacrylic acid ammonium salt solution (1.0 wt % of solids, and a molecular weight of 10,000), and 60 g of polyasparaginic acid ammonium salt solution (1 wt % of solids, and a molecular weight of 5,000) were added to 40 g of ceria powder synthesized according to comparative example 1, and strongly shaken in an airtight container to produce a mixed solution, and pH of the mixed solution was controlled to 7.0. However, the precipitation occurred and the dispersibility was poor. 2 kg of fourth polishing slurry was produced using an ultrasonic homogenizer.

The fourth polishing slurry had 2 wt % of solids, pH of 7.0, and excellent dispersibility. Additionally, the fourth polishing slurry contains 1.5 wt % of dispersing agent based on a solid in the polishing slurry. Further, a particle size of the fourth polishing slurry was analyzed, resulted in that an average size of secondary particles of the fourth polishing slurry was 293 nm, and a zeta potential of the fourth polishing slurry was 28.5 mV.

The polishing tests for the silicon oxide and silicon nitride samples were performed in the same manner as in Example 4. The results are described in the following Table 1. The polishing solution of concentrate of the present invention was the same as or superior to the conventional polishing solution using dry particles in terms of polishing characteristics, such as the polishing speed of the silicon oxide layer, and the selectivity of the silicon oxide layer to the silicon nitride layer.

TABLE 1

Polishing of silicon oxide and silicon nitride layers

| Polishing Slurry | Particle size | Average size of secondary particles | Zeta potential | Polishing | Polishing speed(Å/min) Silicon oxide | Silicon nitride | Selectivity |
|---|---|---|---|---|---|---|---|
| $1^{st}$ Slurry(Ex. 1) | 13 nm | 205 nm | 52.3 mV | Once | 2524.3 | 38.5 | 65.6 |
|  |  |  |  | Twice | 2564.5 | 39.2 | 65.4 |
| $2^{nd}$ Slurry(Ex. 2) | 52 nm | 223 nm | 36.8 mV | Once | 3657.1 | 68.3 | 53.5 |
|  |  |  |  | Twice | 3600.2 | 66.2 | 54.4 |
| $3^{rd}$ Slurry(Ex 3) | 73 nm | 270 nm | 28.2 mV | Once | 3848.5 | 98.6 | 39.0 |
|  |  |  |  | Twice | 3824.3 | 97.9 | 39.1 |
| $4^{th}$ Slurry(Co.Ex 1) | 53 nm | 293 nm | 28.5 mV | Once | 3737.5 | 73.5 | 50.9 |
|  |  |  |  | Twice | 3765.3 | 74.1 | 50.8 |

The concentrate according to the present invention contains 1 to 50 wt % of fine ceria particles, which is thicker than concentration of ceria in the conventional CMP slurry for semiconductor planarization. As a result, the CMP slurry can be prepared by diluting the concentrate according to the present invention without a concentrating process. In addition, anion components (nitrate, nitrite) and cation components (ammonium ion, etc.) in the concentrate, each are 10 ppm or less, and thus the concentrate may be used to make a desired CMP slurry without additional processes, such as, washing process and deionization process. As such, the CMP slurry of a concentrate of the present invention has excellent polishing quality. On the other hand, as described in the comparative examples, washing process of nitric acid as a by-product is inevitably required and anion components are not easily removed by only a washing process. Moreover, the loss of ceria is easily occurred in the washing and drying processes. Physical properties of the particles may be changed to agglomerate the fine particles during the oven drying process, and thus an additional dispersion process is required when slurry is formed. In addition, average size of secondary particles is large even though the dispersion process is completed. A zeta potential is low and thus the dispersibility is relatively poor.

INDUSTRIAL APPLICABILITY

As apparent from the above description, in comparison with a conventional technology, the present invention provides fine, nano-sized ceria particles. In the present invention, an average size of primary particles is easily controlled, nitric acid as a by-product is desirably decomposed, and it is easy to produce a reaction product solution similar to in the case of dispersing highly pure powder, containing few impurities, in water. Accordingly, a separating process of waste water containing the by-product and a washing and purifying process of the powder, which are regarded as essential processes in a conventional liquid phase process of preparing metal oxides, may be omitted. Additionally, the reaction product solution is sufficiently concentrated in a concentrator installed at a rear end of a reactor to produce highly pure ceria powder, containing few impurities, and the ceria powder is usefully applied to produce a polishing slurry. Therefore, the present invention is advantageous in that energy and time required in a solid/liquid phase separation process and a drying process are significantly reduced, a loss of the powder, easily occurring in the solid/liquid phase separation process and drying process, is avoided, and aggregation and thermal deformation of the particles, constituting the powder, due to the drying process are avoided, thereby ensuring excellent economic efficiency and preparing the fine ceria particle with excellent quality.

Moreover, the concentrate of fine ceria particles, which is produced through a diluting process and an additive adding process according to the present invention, may be used as a polishing solution. At this time, examples of the additive include a dispersing agent. When the polishing is conducted using the concentrate as the polishing solution, a polishing speed is very high and a polishing speed ratio (selectivity) of a silicon oxide layer to a silicon nitride layer is very high in comparison with the case of using conventional colloidal silica. Furthermore, the production of the polishing solution according to the present invention is easily conducted. As well, the polishing solution of the present invention is the same as or superior to the conventional polishing solution using dry particles in terms of polishing characteristics, such as dispersion characteristics, the polishing speed of the silicon oxide layer, and the selectivity of the silicon oxide layer to the silicon nitride layer.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A method of preparing a concentrate of fine ceria particles that is ready for use for chemical mechanical polishing of a substrate, the method comprising the steps:

a) reacting a reactant mixture comprising:
i) water,
ii) an aqueous solution of water-soluble cerium salt compound, and
iii) ammonia or an ammonium salt at a reaction temperature of 250-700° C. under a reaction pressure of 180-550 bar for 0.01 sec to 10 min in a continuous reactor to produce a solution containing the fine ceria particles, the cerium salt compound being present in an amount of 0.01 to 20 wt % in the reactant mixture; and
b) concentrating the solution containing the fine ceria particles in a concentrator having a filter with a pore size of 0.01 to 10 μm,
wherein the cerium salt is selected from the group consisting of cerium nitrate, ammonium cerium nitrate, and a mixture thereof, and the ammonia or ammonium salt is present in the reactant mixture at a molar ratio of 0.5-3 relative to nitric acid to achieve conversion stoichiometrically from the cerium salt compound,
whereby the concentrate of fine ceria particles is ready for use in chemical mechanical polishing without further processing.

2. The method as set forth in claim 1, wherein step (a) further comprises:
providing water subjected to pressurizing and heating;
providing an aqueous solution of a water-soluble cerium salt compound subjected to pressurizing;
providing a fluid containing ammonia or an ammonium salt subjected to pressurizing; and
mixing the heated and pressurized water with the aqueous solution of the water-soluble cerium salt compound and the fluid containing ammonia or an ammonia salt to provide a reaction mixture,
wherein, the resulting mixture is maintained at a temperature of 250-700°C. and a pressure of 180-550 bar.

3. The method as set forth in claim 1, wherein the ammonia or ammonium salt is in the form of ammonia gas, an aqueous ammonia solution or an aqueous solution of an ammonium salt.

4. The method as set forth in claim 1, wherein the concentrate contains 1 to 50 wt % of the fine ceria particles.

5. The method as set forth in claim 4, wherein the concentrate contains 1 to 30 wt % of the fine ceria particles.

6. The method as set forth in claim 1, wherein the fine ceria particles in the concentrate have a particle size of 1-200 nm.

7. The method as set forth in claim 1 wherein the fine ceria particles in the concentrate have a specific surface area of 2-200 m2/g.

8. The method as set forth in claim 1, wherein the filter has a pore size of 0.1 to 5 μm.

9. The method as set forth in claim 1, wherein the concentrator has a sintered metal filter.

* * * * *